United States Patent [19]
Garcia

[11] Patent Number: 6,015,472
[45] Date of Patent: Jan. 18, 2000

[54] METHOD OF PRODUCING A BALLOON WITH A SELF-SEALING VALVE

[75] Inventor: Arturo Verduzco Garcia, Jalisco, Mexico

[73] Assignee: Convertidora Industrial S.A. DE C.V., Guadalajara, Mexico

[21] Appl. No.: 09/130,935

[22] Filed: Aug. 7, 1998

Related U.S. Application Data

[62] Division of application No. 08/564,486, Nov. 29, 1995, Pat. No. 5,860,441.

[51] Int. Cl.$^7$ ..................................................... A63H 27/10
[52] U.S. Cl. ......................................... 156/290; 156/308.4
[58] Field of Search .......................... 156/290, 308.2, 156/308.4, 229, 85; 446/224; 137/223

[56] References Cited

U.S. PATENT DOCUMENTS

| | | |
|---|---|---|
| 2,597,924 | 5/1952 | Davenport et al. . |
| 2,799,314 | 7/1957 | Dreyer et al. . |
| 3,137,438 | 6/1964 | Milton . |
| 3,332,415 | 7/1967 | Ericson . |
| 3,430,842 | 3/1969 | Yamaguchi . |
| 3,554,135 | 1/1971 | Duvall . |
| 3,664,058 | 5/1972 | Brieske . |
| 4,077,588 | 3/1978 | Hurst . |
| 4,169,548 | 10/1979 | Bond . |
| 4,421,297 | 12/1983 | Pongrass et al. . |
| 4,481,753 | 11/1984 | Rutter et al. . |
| 4,524,458 | 6/1985 | Pongrass et al. . |
| 4,574,559 | 3/1986 | Rutter et al. . |
| 4,586,910 | 5/1986 | Buchanan . |
| 4,674,532 | 6/1987 | Koyanagi .......................... 173/512.15 |
| 4,708,167 | 11/1987 | Koyanagi ........................... 137/512.15 |
| 4,721,491 | 1/1988 | Buchanan . |
| 4,758,198 | 7/1988 | Ishiwa . |
| 4,842,007 | 6/1989 | Kurtz . |
| 4,850,912 | 7/1989 | Koyangi ............................ 137/512.15 |
| 4,917,646 | 4/1990 | Kieves ..................................... 446/224 |
| 4,983,138 | 1/1991 | McGrath . |
| 5,108,339 | 4/1992 | Kieves ..................................... 446/221 |
| 5,169,353 | 12/1992 | Myers . |
| 5,188,558 | 2/1993 | Barton et al. ........................... 446/224 |
| 5,248,275 | 9/1993 | McGrath et al. ....................... 446/224 |
| 5,259,805 | 11/1993 | Kieves . |
| 5,295,892 | 3/1994 | Felton ..................................... 446/224 |
| 5,308,163 | 5/1994 | Abe . |
| 5,336,123 | 8/1994 | Laske et al. ............................. 446/224 |
| 5,338,243 | 8/1994 | Kieves . |
| 5,405,479 | 4/1995 | Anderson ............................... 156/308.4 |
| 5,460,200 | 10/1995 | Glicksman ........................... 137/512.4 |
| 5,482,492 | 1/1996 | Becker ..................................... 446/224 |

FOREIGN PATENT DOCUMENTS 134446   8/1974   Japan .

*Primary Examiner*—Daniel Stemmer
*Attorney, Agent, or Firm*—Arnold White & Durkee

[57] ABSTRACT

The present invention relates to a self-sealing flexible plastic valve for a non-latex balloon, to a balloon incorporating such a valve, to a method of manufacturing such a valve, and to a method of manufacturing a balloon incorporating such a valve. The valve is made from two flexible plastic strips, bonded together along the side edges to define a valve passageway or tube, and having an open inlet end and an open outlet end. The inlet end of one or both valve strips flares or otherwise curls outwardly to facilitate opening of the valve to insert a gas supply mechanism to inflate the balloon.

7 Claims, 6 Drawing Sheets

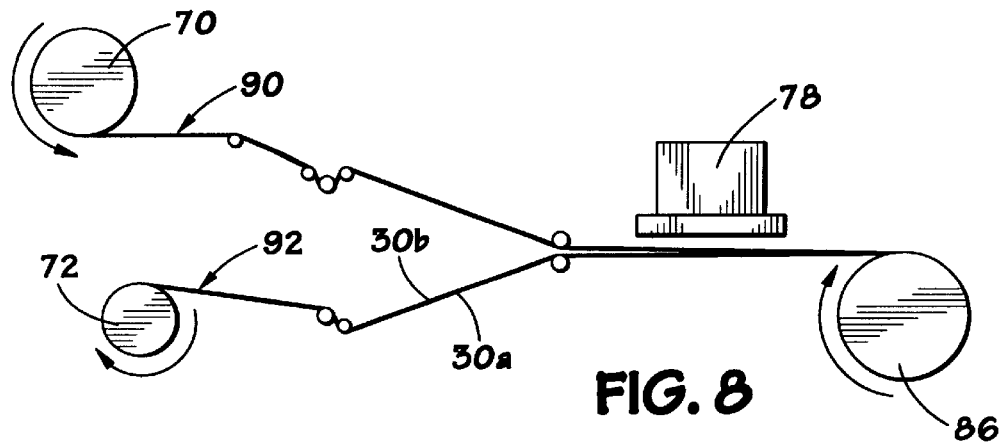
FIG. 8
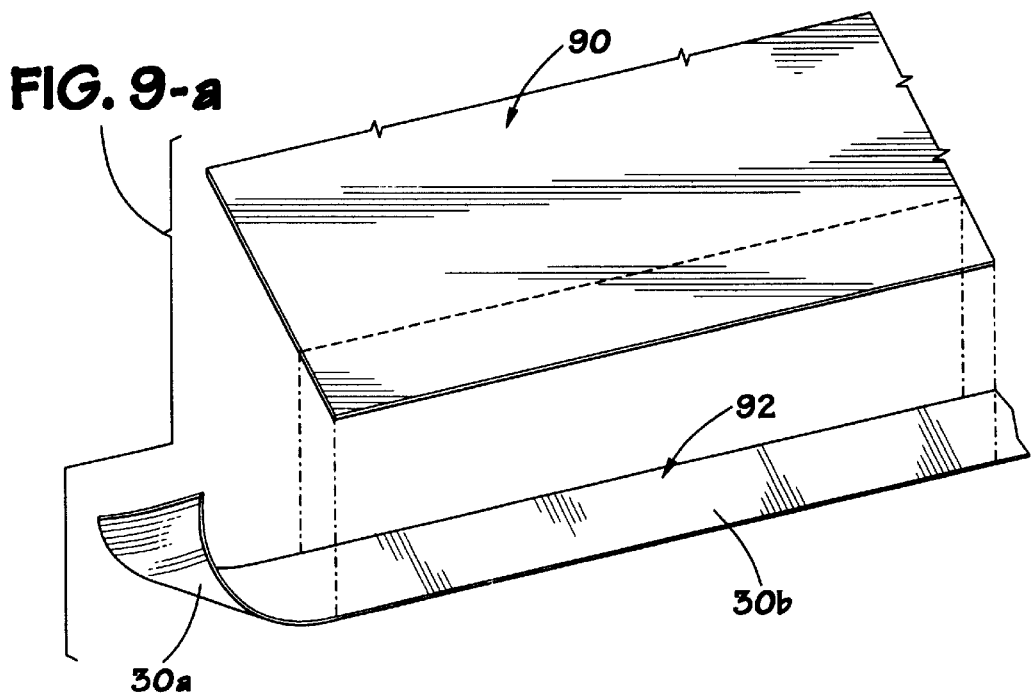
FIG. 9-a
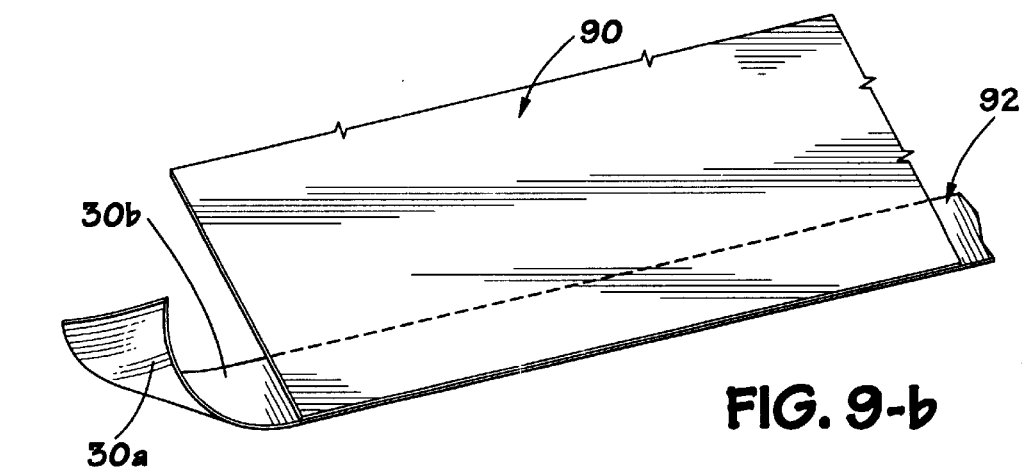
FIG. 9-b

METHOD OF PRODUCING A BALLOON WITH A SELF-SEALING VALVE

This is a divisional of application Ser. No. 08/564,486 filed Nov. 29, 1995, now U.S. Pat. No. 5,860,441 which is incorporated herein by reference in its entirety.

BACKGROUND OF THE INVENTION

1. Field of the Invention

The present invention relates to a self-sealing plastic valve for inserting gas into an inflatable non-latex balloon and for sealing such a balloon after inflation. The present invention also relates to an inflatable non-latex balloon incorporating such a valve. The present invention further relates to a method for manufacturing such valves and for producing balloons incorporating such valves. The valves are especially characterized by inlets which flare or otherwise curl outwardly.

2. Related Art

As used herein, and as well-known in the prior art, the term "balloon" means an inflatable toy or other non-latex inflatable device, typically made of plastic sheet material which is generally non-elastic relative to rubber latex. A balloon typically includes a balloon body and may also have a balloon stem. Such a balloon normally is made from two flexible plastic (or non-latex) sheets which are cut and sealed together so as to produce various designs and configurations. The material from which the balloon is made is highly impermeable, but very thin. It is often referred to as non-latex, because it lacks the highly elastic properties of rubber latex.

Balloons are inflated using a gas supply mechanism, usually a type of nozzle. The nozzle may be inserted directly into the balloon, between the sheets of balloon material, to inflate the balloon. The balloon, however, may be equipped with a valve. If it is so equipped, the gas supply mechanism may be inserted into the valve, between the two plastic valve sheets. Such valves must be extremely thin and flexible, because part or all of the valve must be inserted and lie between the sheets of balloon material.

One balloon described in the prior art has a balloon body and a balloon stem, and employs a self-sealing valve fabricated from plastic sheet material. The valve is incorporated into the balloon and the inlet ends of the valve sheets are completely fused or bonded to the balloon material so that there are no free inlet ends of the valve and the valve lies entirely within the balloon. The valve cannot function if the inlet ends of both plastic valve sheets are not bonded to the respective balloon film sheets. The gas supply mechanism is inserted into the balloon stem into a passageway formed between the sheets of balloon material. The passageway, when opened apart, then opens the valve for the gas to pass through to inflate the balloon body. The valve is not used for insertion of the gas supply mechanism.

In another prior art balloon with a self-sealing valve, the valve is surrounded by balloon material, i.e., the balloon stem. However, the valve is exposed through an opening in the balloon material so that the gas supply mechanism is inserted into the valve between the valve sheets, rather than between the sheets of balloon material.

Another prior art balloon incorporates a self-sealing valve in which the inlet end of the valve hangs freely outside the balloon, extending from the balloon body or the balloon stem. The gas supply mechanism is inserted into the valve between the valve sheets, which enables gas to flow into and inflate the balloon body.

Because of the thinness of the valve sheets used to form valves for use with inflatable non-latex balloons, problems have arisen in separating the two valve sheets of a valve in order to insert a gas supply mechanism. Insertion and separation problems frequently cause the valves to be torn or punctured, thereby diminishing or ending their utility. Also, the valve sheets tend to stick together, causing difficulty and delay in inflating the balloon. This is especially the case where the two valve sheets which make up a valve are coterminous at the inlet end of the valve, i.e., one valve sheet does not extend beyond the end of the other.

One known method for producing balloons incorporating self-sealing valves relies upon the valve having valve sheets of different lengths. The longer sheet has an extension, or positioning tab, at the inlet end of the valve. The positioning tab is used to position the valve to lie entirely within the balloon. This method of making a balloon, however, has several disadvantages. First, sheets used for the valve must have non-coterminous inlet ends. Second, since the valve lies entirely within the balloon, it is not visible to a person looking at the balloon in its finished state, or during manufacture of the balloon. Thus, during manufacture it cannot be readily or easily known whether the valve is actually or properly placed into the balloon. Third, it cannot be readily determined whether the valve sheets are completely or properly fused to the balloon material, so as to enable gas to flow through the balloon stem and then through the valve. These problems can frequently result in a balloon having no valve or a misplaced valve, such that a defective balloon is sold to customers.

It is apparent from the above discussion of the prior art that serious problems remain in the manufacture and structure of self-sealing valves and of non-latex balloons incorporating such valves. Better valves for such balloons are a particular need.

SUMMARY OF THE INVENTION

The present invention addresses the problems described above. Broadly, the invention relates to a self-sealing flexible plastic valve for inserting a gas supply mechanism into a non-latex inflatable balloon, to a balloon incorporating such a self-sealing valve, to a method of producing a self-sealing valve and to a method of producing a balloon incorporating the valve. The flat valve body is made from two strips of flexible plastic valve sheet, sealed together along their side edges to define a valve passageway, and leaving the ends of the valve open, so that there is an inlet end and an outlet end. The inlet end is used for insertion of the gas supply mechanism; the outlet end is the end from which the gas flows into the balloon. The inlet ends of the valve of the invention cannot be completely fused or bonded to the balloon sheets.

The inlet end of a valve of the invention flares or otherwise curls outwardly to facilitate entry of an inflation or deflation tool into the valve. In one embodiment, one or more ribbons or strips of laminated plastic film are secured to one or both of the valve strips, respectively, at the inlet end of the valve to facilitate separation of the valve strips when inserting the gas supply mechanism. The layers of each ribbon or strip are differentially tensioned or stressed and the ribbon or strip therefore tends to curl. The curling results from differential stretching, shrinkage, crimping, constriction, or the like of at least one layer at some point in the formation of the ribbon or strip. In other words, one layer is selected to be more dimensionally stable than another layer when the layer or layers are stretched, heated, shrunk, or the like. When the curling ribbons are secured to the valve, the locked-in differential length causes the ribboned ends of the valve strips to flare or otherwise curl away relative to one another and thereby provide easy access for a nozzle or other gas supply mechanism to enter the inlet end of the valve.

The invention in one broad aspect accordingly concerns a self-sealing flexible plastic valve mechanism for facilitating separation of the valve sheets of a valve for easier insertion of a gas supply mechanism into the valve. In a similarly broad aspect, the invention concerns a method of making such a curling ribbon and a valve with such ribbon.

In yet other aspects of the invention, the invention pertains to a balloon incorporating such a valve and to a method of making such a balloon.

As stated above, a key feature of valves of the invention resides in an inlet structure which tends to open for reception of an inflation tool. As stated above, this tendency is imparted to the inlet structure by a laminated plastic ribbon comprising at least two layers in which one layer is differentially stretched or shortened relative to the other to thereby impart a curling tendency to the ribbon. One of the layers may be stretched more or less relative to another of the layers just before the layers are laminated together. As a consequence, when a stretching force or forces are released following such lamination, differential stresses exist within the different layers.

Similarly, one of the layers in a curling laminate may have a different thermal shrinkage characteristic than another layer. Accordingly, when the two layers are laminated in a heated condition, or when they are heat-sealed or otherwise heat-treated following their lamination, one layer strives to shrink to a different extent relative to the other layer. This differential heating shrinkage causes the laminated plastic film to curl. Additional heat-sealing of the laminated film, for instance during manufacture of the valve and of the balloon, causes a further curling action.

In the practice of the invention, one of the external layers or faces of the laminated ribbon comprises a material which heat-seals with the internal surface of the balloon valve. Thus, one of the layers is preferably a polyolefin, especially polyethylene. The other external layer or face preferably comprises a material which is essentially thermally stable and not heat-sealable under the conditions prevailing during lamination or balloon assembly in the practice of the invention. A preferred material for such a layer comprises nylon, metallized nylon, or the like. Especially preferred is metallized nylon in which one face of the nylon is metallized.

For purposes of the present disclosure, the laminates produced with a curling tendency may be referred to for convenience as curling laminates, ribbons, strips, or the like.

Bonding of a curling laminate of the invention may be obtained with adhesives employed to bond layers of balloon sheet materials together. A curling laminate of the invention is preferably manufactured by unreeling individual layers or laminae from reels, applying an adhesive along at least one of the surfaces to be bonded, and rolling or otherwise pressing the layers together, thereby causing the two layers to be bonded together. Bonding is preferably performed by means of solventless adhesives.

As stated earlier, the bonding of a curling laminate is coordinated with differential stretching, shrinking, etc., of the layers to produce a curling effect in the final product. In making a balloon valve of the invention, the dimensionally stable surface of the curling laminate forms one surface, and preferably two opposing surfaces, of the entrance to the valve. Curling of the laminate helps to keep the entrance open and facilitates entry of a nozzle or other inflation tool into the valve. Metallization of the thermally stable layer also helps to identify the opening to the valve. When a metallized film such as metallized nylon is employed as the thermally stable layer, the non-metallized side or surface of this layer is bonded to the heat-sealable layer.

DESCRIPTION OF THE DRAWINGS

FIG. 8 is a schematic view of an apparatus employed in another embodiment to practice a method of manufacturing a valve of the invention.

FIG. 9-a is a schematic perspective view of one embodiment of a curling ribbon prior to bonding to a valve sheet.

FIG. 9-b is a schematic perspective view of one embodiment of a curling ribbon subsequent to bonding to a valve sheet.

DETAILED DESCRIPTION OF SPECIFIC EMBODIMENTS

An important feature of one embodiment of the present invention lies in curling plastic strips or ribbons which are attached coincident to the inlet end of a flexible plastic valve for a non-latex balloon. The curling strip is made using techniques generally similar to the techniques used to make non-latex balloons. Generally, and by way of example, non-latex toy balloons are typically made from two sheets of laminated nylon/polyethylene in which each sheet comprises a layer of heat-sealable polyolefin (polyethylene or other plastic) which is laminated to a layer of heat-stable nylon or metallized nylon. To produce the balloon, the two laminated sheets are typically placed together, and then bonded or heat-sealed together in various configurations, and cut around the periphery of the heat-seal.

Self-sealing flexible plastic valves used in non-latex balloons are typically formed by placing two sheets of a heat-sealable plastic together face-to-face, making surface-to-surface contact. Heat seals or bonds transverse to the sheets are then made at spaced intervals along the sheets. Cuts are then made across the sheets over the heat seals to produce a plurality of flat plastic tubes, each having two plastic sheets or strips with their side edges sealed together. The non-bonded central portion between each pair of sealed side edges constitutes the passageway of the valve. A mineral oil or other suitable material applied to the interior surface of the passageway helps render the valve self-sealing when used in the balloon. Additionally, a heat-resistant ink is applied to at least that portion of the passageway which lies across the neck of the balloon to prevent the valve sheets from sealing together when the periphery of the balloon is sealed.

The curling strips or ribbons of the invention are preferably made from two sheets of material, one heat-stable and the other heat-sealable, having differential stretch and/or shrinkage properties, which are laminated together surface-to-surface. Typically, one sheet is of a polyethylene material and the other is of a nylon or metallized nylon material. It is understood that the term "heat-stable" means "stable" or "resistant", and the term "heat-sealable" means "sealable" under the conditions and temperatures used for lamination.

Figure 1:
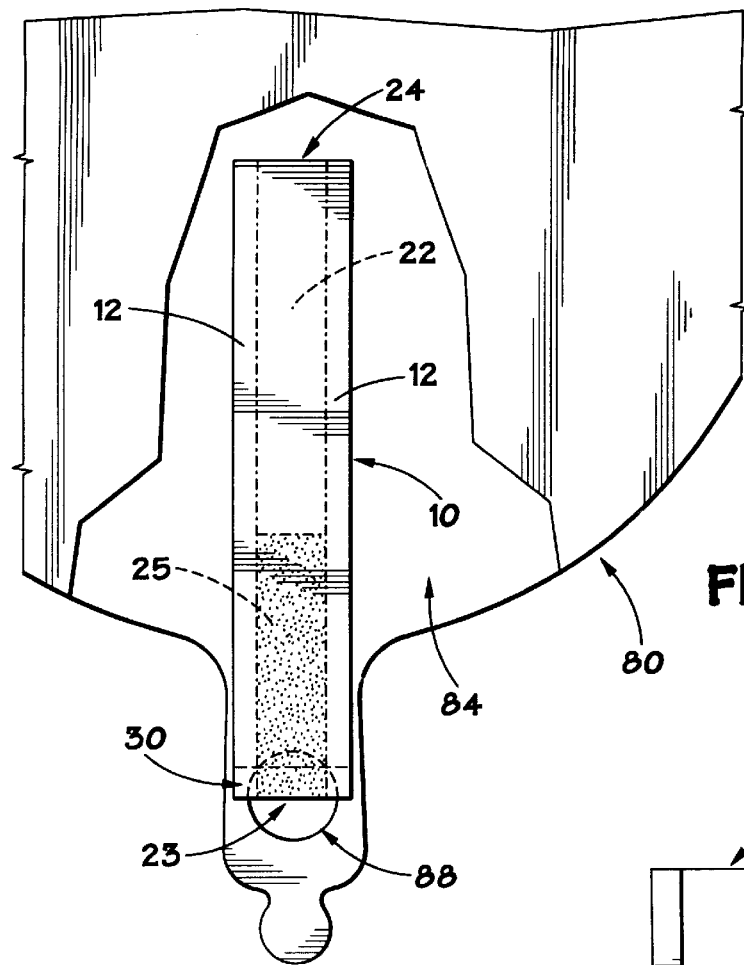
FIG. 1 is a schematic top view of a portion of a balloon equipped with a valve of the invention.
Figure 2:
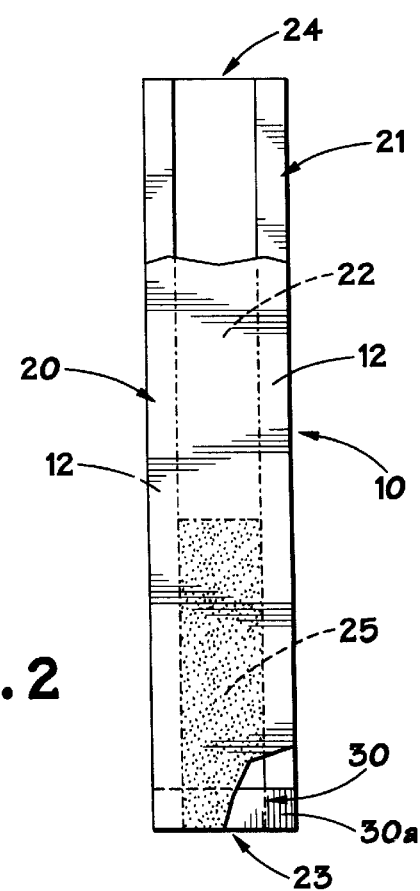
FIG. 2 is a schematic top view of one embodiment of a valve of the invention.
Figure 3:
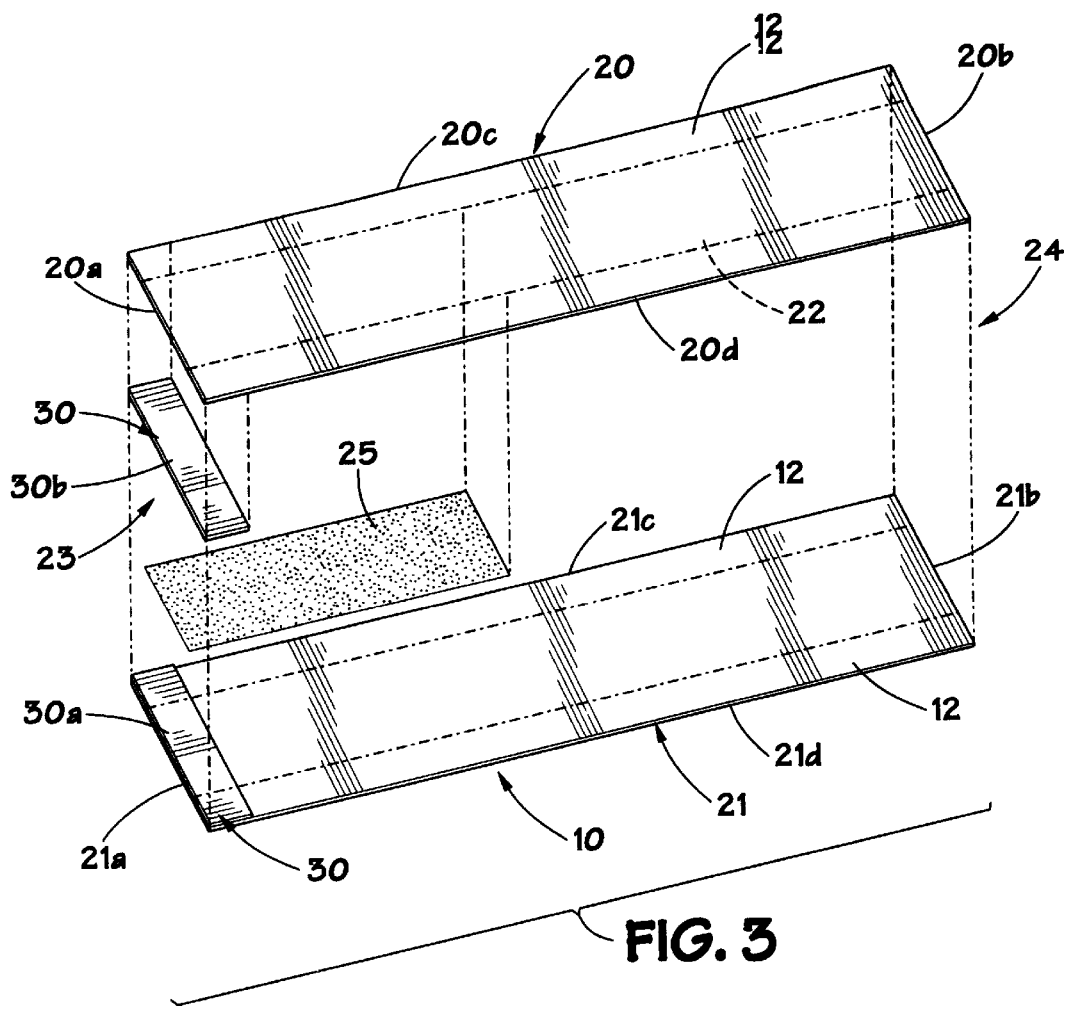
FIG. 3 is a perspective schematic view of two valve sheets prior to bonding.

FIG. 1 shows a portion of an inflatable non-latex toy balloon 80 having one preferred embodiment of a self-sealing valve 10 with curling ribbons 30. FIG. 2 shows one preferred embodiment of a self-sealing flexible plastic valve 10 of the present invention. FIG. 3 shows an enlarged perspective view of a valve 10. The self-sealing flexible plastic valve 10 includes first and second flexible plastic valve sheets 20 and 21. The first and second flexible plastic valve sheets 20 and 21 have first or inlet end edges 20a and 21a, respectively, second or outlet end edges 20b and 21b, respectively, and side edges 20c and 20d, and 21c and 21d, respectively.

The bonding of the side edges of the plastic valve sheets is preferably done by heat-sealing to form gas-impermeable side edge heat seals. As shown in FIGS. 2 and 3, side edge 20c of the first flexible plastic valve sheet 20 is secured or bonded to side edge 21c of the second flexible plastic valve sheet 21 to produce a sealed side edge 12 of valve 10. Side edge 20d of the first flexible plastic valve sheet 20 is secured or bonded to side edge 21d of the second flexible plastic valve sheet 21 to produce a second sealed side edge 12 of valve 10. The first and second flexible plastic valve sheets 20 and 21 secured together define a valve 10 having a valve passageway 22, a valve inlet or inlet end 23, and a valve outlet or outlet end 24. The central passageway 22 of the valve 10 lies between the two heat-sealed side edges 12 of the valve 10. The shaded area in the passageway 22 is heat-resistant ink 25. The mineral oil is not shown.

Also referring to FIGS. 2 and 3, a curling ribbon 30 is secured to, and extends across the width of, the first flexible plastic valve sheet 20 at or coincident to the inlet end edge 20a. A second curling ribbon 30 is secured to, and extends across the width of, the second flexible plastic valve sheet 21 at or coincident to the inlet end edge 21a.

In one embodiment, the first and second flexible plastic valve sheets 20 and 21 are coterminous at the inlet end 23 of the valve 10 and two curling ribbons 30 are attached to valve 10, one at the inlet end of each valve sheet. However, it is contemplated that the inlet end edges 20a and 21a of the two valve sheets 20 and 21, respectively, may be non-coterminous. It is also contemplated that only one curling ribbon 30 may be used in valve 10.

Figure 4:
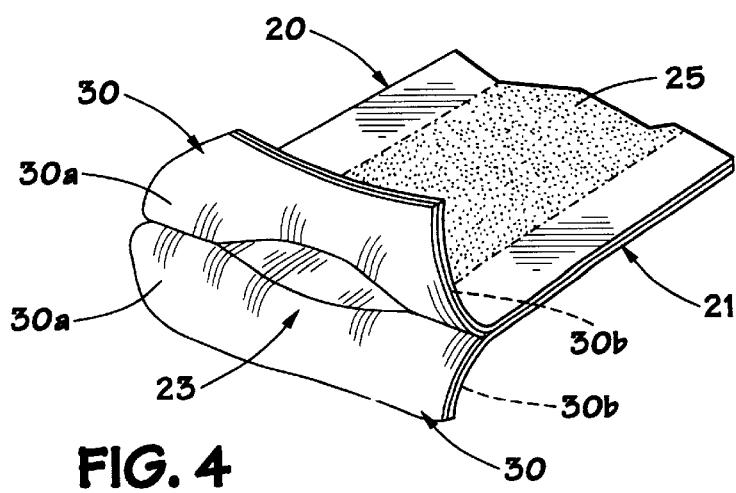
FIG. 4 is a perspective view of the inlet portion of one embodiment of a valve of the invention.

In one embodiment, curling ribbon 30 is constructed of a laminated nylon/polyethylene laminated film which is heat-stable, or thermoresistant, on one side or face 30a and heat-sealable on the other side or face 30b. A heat-stable/heat-sealable laminated film of the invention possesses a curling effect due to the inherent or built-in properties of the two components. Polyethylene, a heat-sealable material, shrinks when heated; nylon, a heat-stable material, does not. Polyethylene also stretches more than nylon. As used herein, the nylon material preferably includes a layer of metal. This allows the nylon material to be more easily handled and has the advantages of being easily visible and resistant to heat-sealing and shrinking. It is understood that the metallized face of the nylon sheet will face away from the heat-sealable layer of the curling ribbon. Lamination of the two materials together, while taking into account these differences in properties, thereby enables a curling effect to be achieved. Thus, in one embodiment, one side of curling ribbon 30 (i.e., the nylon side 30a) remains generally the same size when heated and the other side (i.e., the polyethylene side 30b) shrinks. As shown in FIG. 4, securing the laminated film coincident to the inlet end of a flexible plastic valve sheet produces a curling effect at the inlet end of the valve, making it easier to introduce the gas supply mechanism.

Figure 5:
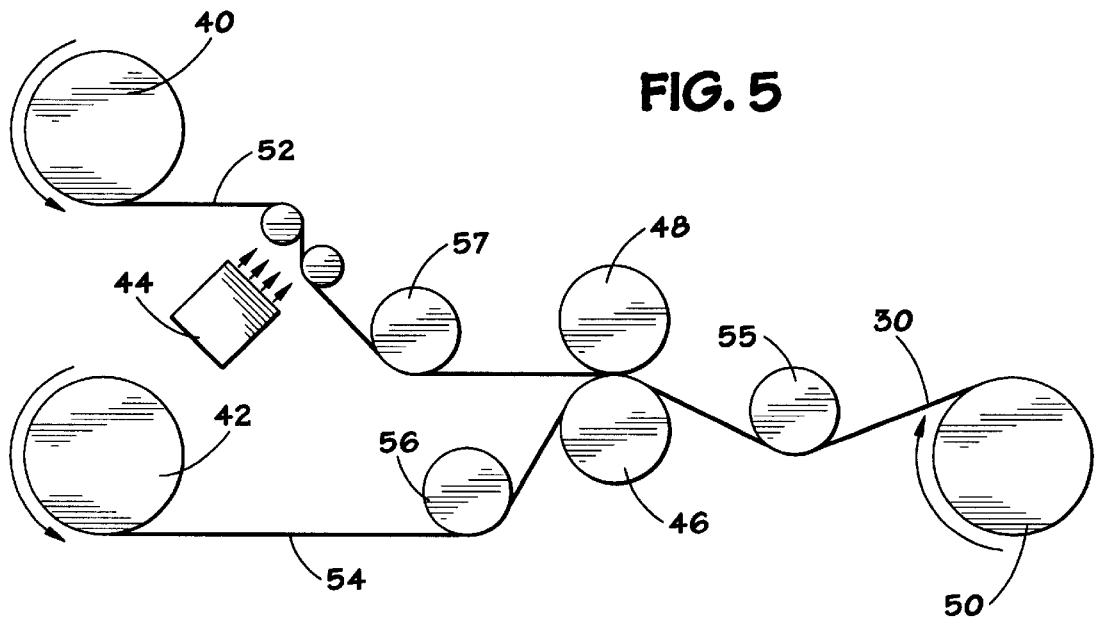
FIG. 5 is a schematic view of an apparatus used in one embodiment of a method of manufacturing a curling ribbon of the invention.

FIG. 5 is a schematic of an embodiment by which the curling ribbons of the invention may be made. The apparatus includes two unwinders or feed reels 40 and 42, an adhesive coating system 44, laminating rolls 46 and 48, tensioning rolls or devices 55, 56, and 57 and a winder or take-up reel 50. A sheet 52 of a heat-stable material such as nylon or metallized nylon is drawn from feed reel 40; and a sheet 54 of heat-sealable material such as polyolefin, especially polyethylene, is similarly drawn from reel 42. Roll 46 is preferably a metallic or chrome surfaced roll. Roll 48 is preferably a rubber surfaced roll. It is contemplated, however, that rollers constructed of other materials may be used.

As sheet 52 is unwound from reel 40, it passes to the adhesive coating assembly or system 44 for application of the adhesive and to the tensioning roll 57 which smooths the sheet. The coating assembly or system 44 typically includes two or more rolls. One roll acts to feed an adhesive, preferably solventless, to a coating roll. (Additional rolls, not shown, may be included between the feed roll and coating roll.) As sheet 52 passes around the coating roll, the desired quantity of adhesive is applied to the nylon sheet 52. If the sheet 52 is of a metallized nylon material (i.e., includes a metallized layer), the metallized side faces away from the polyethylene sheet 54 and the adhesive is applied to the non-metallized side. Polyethylene sheet 54, meanwhile, passes around a tensioning roll 56 where it is tensioned or stretched a predetermined amount relative to the size of sheet 52. One or more of the rolls may be pneumatically loaded.

The tensions of the two sheets—heat-sealable sheet 54 and heat-stable sheet 52—are controlled to establish a differential tension between the two sheets. Thus tensioned, the two sheets enter between laminating rolls 46 and 48 where they are pressed together and bonded by the adhesive producing a laminated sheet of curling ribbon 30.

From this point, the laminated sheet of curling ribbon 30 travels along a series of guide or idler rolls and possibly an annealing roll (not shown) to tension system 55 and wound on the take-up reel 50.

Adhesives similar to those employed in preparing the laminated plastic sheets from which non-latex balloons are made may be used in fabricating the curling strips. Preferred adhesives are solventless adhesives available from a number of suppliers, including Herberts Adhesive Resin 2K-LF 500 A/Hardener 424 manufactured by Herberts GmbH, Tycel® 7975 Adhesive and Tycel® 7276 Curling Agent manufactured by Liofol Company, and Mor-Free™ 403A Adhesive manufactured by Morton International, Inc. Solventless adhesives are used because of the reduction or elimination of drying time when applied on the nylon sheets. It is also preferred that the amount of adhesive used be approximately 1.2–1.5 grams of adhesive per square meter of sheet material. However, any amount may be used as necessary to achieve the desired lamination.

The equipment of the type shown schematically in FIG. 5 is available from a number of suppliers. Moreover, the equipment is typically comprised of components made by a number of manufacturers. For example, laminating machinery supplied by Comexi of Gerona, Spain, has been employed in connection with the invention. Such machinery includes tension control systems made by BST.

When released of all tension or stress devices, the heat-sealable (polyethylene) side of the resultant laminated curling ribbon 30 will shrink or compress, causing the heat-stable (nylon) side to curl around the heat-sealable (polyethylene) side.

After being wound on reel 50, the resultant nylon/polyethylene laminated film 30 may be unwound and cut into strips; alternatively, the laminated film 30 may be cut prior to winding. It is also contemplated that the sheet of heat-stable material 52 and the sheet of heat-sealable material 54 may be separately cut into strips, ribbons, or other pieces which are then laminated to produce film 30.

It will be apparent that curling film 30 may be constructed of any materials with curling properties such that the film tends to roll or raise up when heated. It is only necessary that when secured at the inlet or inlet end 23 of the valve 10, curling ribbon 30 urges the inlet or inlet end 23 of the valve 10 to an open position. It is contemplated that many other materials, for example, other polymers and metallized materials, possess the necessary thermoresistant, shrinkage, stretching, and sealing properties to be used in this invention to produce the intended result.

In a preferred embodiment, curling ribbon 30 is approximately three-eighths to five-eighths of one inch (3/8"–5/8") (9–16 mm) in width, but it is contemplated that the width may be thinner or wider, as necessary, to achieve the desired result. Each curling ribbon 30 has a thickness of approximately 15 mm; it is contemplated that any thickness may be used, as necessary, to achieve the desired result.

A curling strip 30 of the invention may be secured to a self-sealing plastic balloon valve 10 at various steps in the fabrication process of the valve 10, and one or more curling strips 30 may be secured to one or both plastic valve sheets 20 and 21, as desired.

The addition of two curling strips 30 coincident to the inlet end 23 of the valve 10 may be effected at the time when the valve sheets 20 and 21 are heat-sealed together to form the valve 10. Thus, heat-sealing of at least one curling strip 30 to at least one flexible valve sheet 20 or 21 may be performed concomitantly with heat-sealing of the valve sheets 20 and 21 to produce valve 10.

Figure 6:
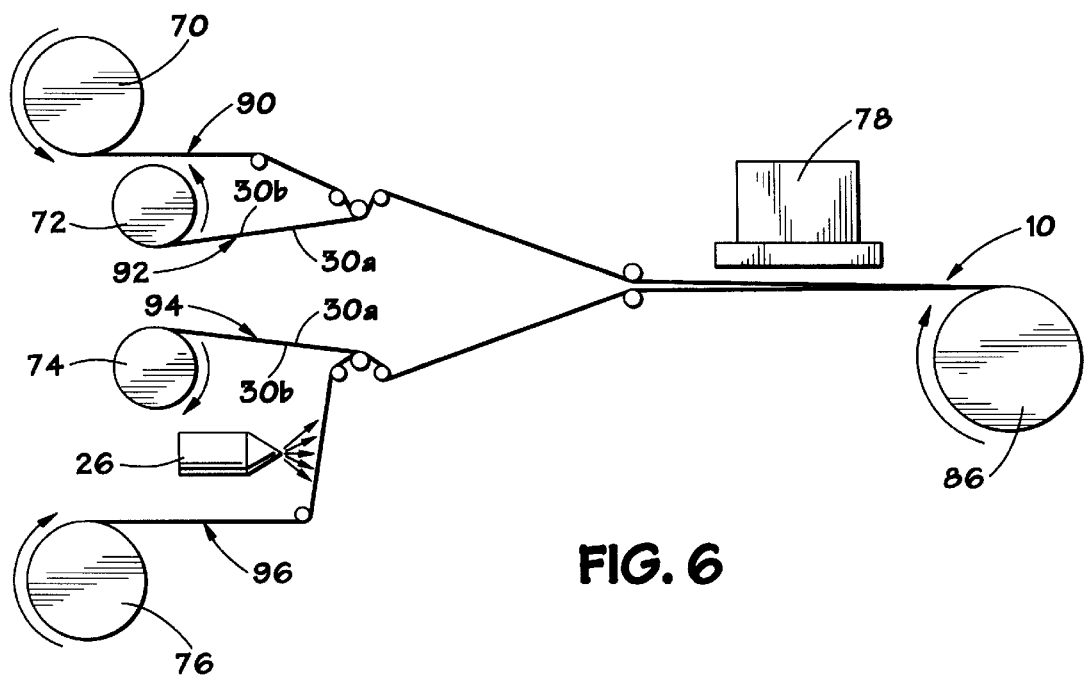
FIG. 6 is a schematic view of an apparatus used in one embodiment of a method of manufacturing a valve of the invention.

FIG. 6 schematically shows an embodiment of apparatus used to make a self-sealing valve of the invention. Valve making equipment of the type shown in FIG. 6 is available from a number of sources, including Flex-Pak Manufacturing, Inc. and, formerly, from Guard Associates, Inc. The apparatus includes four unwinders or feed reels 70, 72, 74, and 76, a sealing die or other heat-seal mechanism 78, various idler, pressure, and tension rolls, and a winder or take-up reel 86. Take-up reel 86 draws a sheet 90 of flexible plastic valve material from reel 70, sheets 92 and 94 of curling ribbon from reels 72 and 74, respectively, and a sheet 96 of flexible plastic valve material from reel 76. (Sheets 90 and 96 of flexible plastic valve material are the same material as plastic valve sheets 20 and 21 referenced above; sheets 92 and 94 of curling ribbon are the same material as curling ribbon or laminated sheet 30 referenced above. Moreover, it is contemplated that only one of sheets 92 and 94 may be used.)

Figure 7:
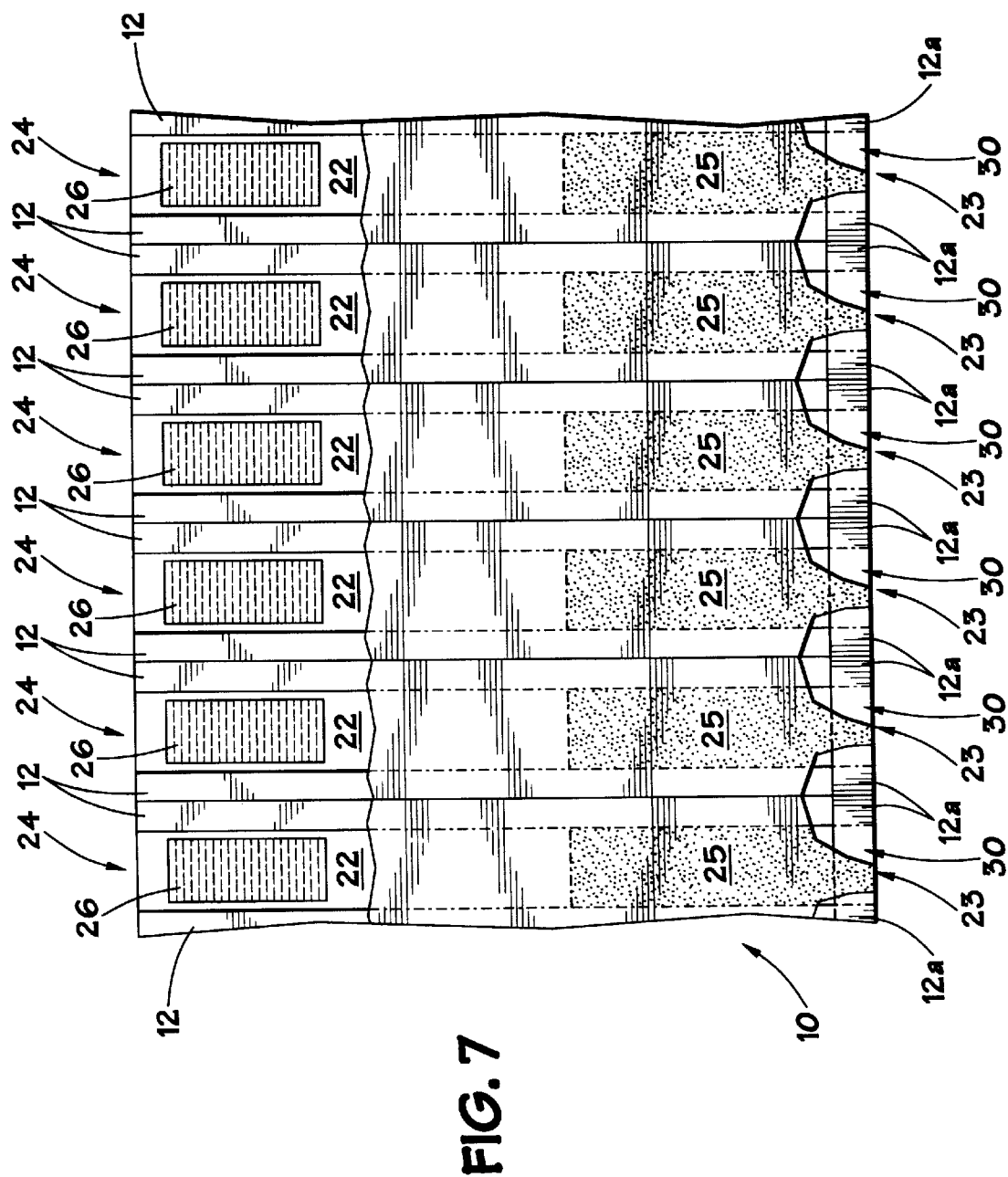
FIG. 7 is a schematic top view of a valve sheet prior to cutting single valves from the valve sheet.

As the four sheets of material 90, 92, 94, and 96 travel towards the take-up reel 86, they flow around various idler, pressure, and tension rolls and are heat-sealed together by sealing die 78 along spaced intervals, producing substantially parallel heat seals 12 along the uncut valve sheet 10 (see FIG. 7). The heat-sealable side 30b of the curling ribbon sheet 92 faces the plastic valve sheet 90. The heat-sealable side 30b of the curling ribbon sheet 94 faces the plastic valve sheet 96. The heat-stable sides 30a of curling ribbon sheets 92 and 94 face each other. This allows the plastic valve sheet material 90 to be heat-sealed to the heat-sealable side 30b of curling ribbon sheet 92 and the plastic valve sheet material 96 to be heat-sealed to the heat-sealable side 30b of curling ribbon sheet 94. Due to the heat-stable sides 30a of the curling ribbons 92 and 94, the two sheets of curling ribbon material 92 and 94 do not become sealed together by heat-sealer 78 during the heat-sealing process. In an embodiment in which only one curling ribbon is used, e.g., curling ribbon sheet 92, the heat-stable side 30a of the curling ribbon material 92 does not become heat-sealed to the plastic valve sheet material 96. Rather, only the heat-sealable side 30b of the sheet of curling ribbon material 92 becomes heat-sealed to the plastic valve sheet material 90.

Moreover, in a preferred embodiment, one edge of each of plastic sheets 90 and 96 and curling ribbons 92 and 94 are aligned together. The edges of plastic sheets 90 and 96 and the edges of the sheets of curling ribbon 30 may also be trimmed off to compensate for any misalignment. In either case, when heat-sealed together and trimmed, if necessary, the pieces of curling ribbon 30 from sheets 92 and 94 of curling ribbon are heat-sealed coincident to the inlet end edge 23 of valve 10. This process produces a sheet of uncut valves 10, as shown in FIG. 7. The heat-seals are indicated by reference 12.

Because the heat-seals 12 are made at spaced intervals transverse to the plastic valve sheets 90 and 96, the resulting effect is that the sheets of curling ribbon 92 and 94 are likewise only heat-sealed to the flexible plastic valve sheets 90 and 94, respectively, at spaced intervals, as indicated by reference 12a in FIG. 7. Also as shown in FIG. 7, a section of valve sheet includes several valves bonded along their sides of heat-seals 12 with valve inlets 23 and valve passageways 22. Dotted areas 26 indicate regions where mineral oil has been applied to at least one interior surface of the valve passageway 22 during manufacture of the valve, as shown in FIG. 6. Area 26 may be smaller or may extend the entire length of the valve passageway. Shaded areas 25 indicate the areas of heat-resistant ink applied to at least one interior surface of the valve passageway. Area 25 may also be smaller or larger, and is used to prevent the valve sheets from sealing together during heat-sealing of the balloon, as explained later. The dotted lateral line proximate the valve inlets indicates an upper boundary of a curling ribbon, and the zones which have double cross-hatching reflect where the curling ribbon is heat-sealed to a respective valve sheet during manufacture of the valve, as explained above. This type of spaced bonding of the curling ribbon is typically the case when bonding of the curling ribbon or ribbons takes place at the same time as bonding of the valve sheets.

In a completed valve 10, the heat-sealing of the curling ribbons 30 to the plastic valve sheets 90 and 96 (or 20 and 21) causes the plastic valve sheets to curl outward, i.e., away from one another. In other words, the heat-stable side 30a of the curling ribbon 30 which, in a completed valve, is on the interior or inner surface of the valve 10, will curl outward around the heat-sealed side 30b which, in a completed valve, is heat-sealed to the flexible plastic valve sheet. Having a curling ribbon heat-sealed to a plastic valve sheet results in the curling ribbon (and, hence, the respective flexible plastic valve sheet) curling away from the other flexible plastic valve sheet, as shown in FIG. 4. This can be accomplished using one or two curling ribbons, and allows the valve to be easily opened.

In another embodiment, shown in FIGS. 8, 9-a, and 9-b, one sheet of laminated film or curling ribbon 92 is heat-sealed to one plastic valve sheet 90 prior to two valve sheets 90 and 96 being heat-seated together. In other words, and as depicted in the block diagram of FIG. 8, take-up reel 86 draws a sheet 90 of flexible plastic valve material from reel 70 and a sheet 92 of curling ribbon from reel 72. The heat-sealable side 30b of curling ribbon sheet 92 faces plastic valve sheet 90. One edge of sheet 90 is aligned to one edge of sheet 92, as shown in FIG. 9-a. (Again, the edges of the two sheets may be trimmed to compensate for any misalignment.) As the two sheets of material 90 and 92 travel towards the take-up reel 86, they flow between and are pressed together by various idler, pressure, and tension rollers. Sheets 90 and 92 are then heat-sealed together by heat seal mechanism 78 along the length of the aligned edges, as shown in FIGS. 8 and 9-b. In one embodiment, the entire length of curling ribbon sheet 92 is heat-sealed along one edge of the flexible plastic valve sheet 90. However, it is contemplated that only portions of the curling ribbon sheet 92 may be heat-sealed by heat-sealer 78 to respective aligned portions of flexible plastic valve sheet 90. The shaded portion of FIG. 9-b shows sheet 92 of curling ribbon heat-sealed to sheet 90 of flexible plastic valve material.

This flexible plastic valve sheet with the curling ribbon is then heat-sealed to a second sheet of flexible plastic valve material (with or without a curling ribbon sheet heat-sealed to it) using the process described above for making valves, as shown in FIG. 6, with the exception that sheets 90 and 92 and sheets 94 and 96, respectively, will have been previously and independently heat-sealed together using the process depicted in FIG. 9-a.

Heat-sealing the curling ribbon 30 to the edge of flexible plastic valve sheet 10 causes that heat-sealed portion of the plastic valve sheet 10 to curl. In a completed valve 10, the heat-stable side of the curling ribbon 30, which is attached to the interior or inner surface of the valve 10 at its inlet end 23, curls outward around the heat-sealed side 30b of the curling ribbon 30, which is now heat-sealed to the flexible plastic valve sheet 10, thereby causing the two valve sheets to oppose one another. Hence, the flexible plastic valve sheets curl away from each other, as shown in FIG. 4.

In yet another embodiment, the side edges 20c and 21c, and 20d and 21d, of two flexible plastic valve sheets 20 and 21 are heat-sealed together, respectively, from the outlet end 24 of a single valve 10 to a relatively short distance from the inlet end 23—i.e., to a point where two curling ribbons 30 are secured to the flexible plastic valve sheets 20 and 21, one to each such valve sheet. The ends of the heat-sealable layer of curling ribbon 30 are heat-sealed to the side-edge portions of flexible plastic sheets 20 and 21 and coincident the inlet end 23 of the valve 10. It is also contemplated that only one curling ribbon 30 may be applied.

As is well known in the art, and shown in FIGS. 1, 2, and 7, one side of at least one of flexible plastic valve sheets 20 and 21 (i.e., the inner surface of valve 10) is coated with a heat-resistant ink 25 along the valve passageway 22 to help prevent the plastic valve sheets 20 and 21 from bonding together in the area of the passageway 22 when the two balloon sheets 120 are heat-sealed together to form the balloon 80. One side of at least one of flexible plastic valve sheets 20 and 21 (i.e., the inner surface of the valve 10) is also preferably coated with a mineral oil 26 or other suitable material to impart a self-sealing property to the valves so as to prevent reverse air flow when the inflation mechanism is withdrawn from the valve. The heat-resistant ink 25 and the mineral oil 26 are typically applied to the sheets of plastic valve material 90 and 96 prior to the sheets being made into valves 10 as described above.

Figure 10:
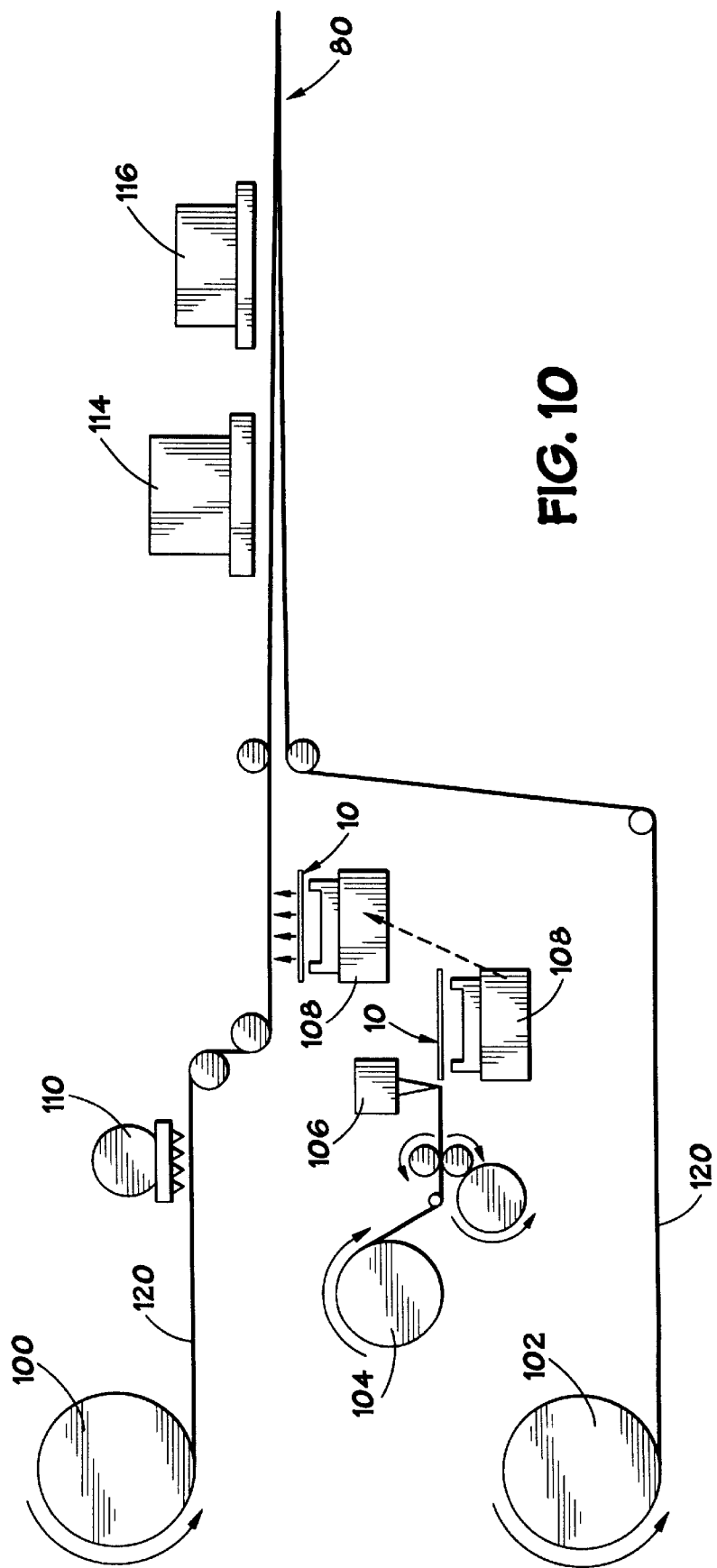
FIG. 10 is a schematic view of an apparatus used in one embodiment of manufacturing a balloon equipped with a valve of the invention.

FIG. 10 shows a schematic view of an embodiment in which a non-latex balloon 80 employing the valve 10 of the present invention may be made. The apparatus includes two unwinders or feed reels 100 and 102, a valve feed roll 104, a valve cutter 106, a valve heat-sealer 108, a balloon inlet punch cutter 110, various rolls, a balloon heat-sealer 114 and a balloon cutter 116.

The balloon 80 may be made from two sheets of non-latex (e.g., nylon/polyethylene or mylar) material 120, cut into matching configurations and heat-sealed together around their peripheries so as to produce an inflatable balloon. Feed reels 100 and 102 each feed a sheet of balloon material 120. As the layers of balloon material 120 are being fed through the balloon-making apparatus, a sheet of uncut valves 10 is simultaneously unrolled from valve feed roll 104. After passing by various rolls, cuts are made by valve cutter 106 across the sheet of uncut valves 10 along the heat seals 12 to produce a single flat plastic valve 10 or a plurality of flat plastic valves 10, each valve having two plastic sheets or strips 20 and 21 with their side edges 20c and 21c, and 20d and 21d, sealed together. The non-bonded central portion between each pair of the sealed side edges 12 constitutes the passageway 22 of the valve 10.

As shown in FIG. 10, a single valve 10 is then attached, preferably by heat-sealing by valve heat-sealer 108, to one balloon sheet 120 at a point on the balloon stem portion of the balloon film between the balloon inlet opening 88 and the balloon body 84. It is understood that the attachment of the valve to the balloon may be at any location, so that the valve is placed where the curled inlet end of the valve will be visible in the balloon inlet opening of the finished balloon, as shown in FIG. 1. The second sheet 120 of balloon material is fed underneath, on top of, or alongside the first sheet 120 of balloon material having the attached valve 10 so that the valve 10 is positioned between the two balloon sheets 120. The two sheets of balloon material are fed between rolls, and then heat-sealed together by heat-sealer 114 in one of numerous configurations so as to produce a balloon 80 having a sealed periphery. During heat-sealing of the periphery of the balloon 80, if the heat-sealer 114 contacts the curling ribbon 30 at the inlet end 23 of the valve 10, further curling or constriction of the inlet end 23 of the valve 10 tends to occur, thus further enhancing the curling tendency of the invention. The heat-sealed configuration is then cut by balloon cutter 116. In the balloon 80, the curling ribbon 30 of valve 10 is visible in the balloon inlet opening 86, to be used for easier insertion of the balloon inflation nozzle, as shown in FIG. 1.

A valve 10 with the curling ribbon of the present invention may also hang freely outside the balloon 80, extending from the balloon body.

Several embodiments of the present invention are described herein. However, it is understood that various modifications may be made to the curling ribbon, the valve, and the balloon, and to the processes for making the curling ribbon, the valve, and the balloon, without departing from the scope of the invention. It is intended that the above description and all drawings shall be interpreted as illustrative and not in a limiting sense.

What is claimed is:

1. A method of producing a balloon with a self-sealing valve having a curling inlet, comprising the steps of:

(a) laminating a first ribbon to a second ribbon under conditions to differentially stress the two ribbons to produce a laminate and curl the laminate;

(b) providing first and second plastic valve sheets having corresponding inlet and outlet ends and corresponding side edges;

(c) securing said laminate to said first plastic valve sheet at the inlet end of said first plastic valve sheet;

(d) securing said first plastic valve sheet to said second plastic valve sheet to define a valve having a valve passageway, a valve inlet at said inlet ends, and a valve outlet;

(e) providing two balloon sheets, one of which has a balloon opening;

(f) securing said valve to a first said balloon sheet with the valve inlet at a position corresponding to said balloon opening; and (g) securing said first balloon sheet to a second balloon sheet to define a balloon, and wherein said valve inlet is visible in said balloon opening.

2. A method as claimed in claim 1 wherein said first ribbon comprises a heat-sealable material and said second ribbon comprises a heat-stable material.

3. A method as claimed in claim 2 wherein said heat-sealable material comprises a polyethylene film and said heat-stable material comprises a laminate of a nylon layer and a metal layer.

4. A method as claimed in claim 2 wherein said lamination in step (a) further comprises the application of an adhesive to secure said first ribbon to said second ribbon to produce said laminate.

5. A method as claimed in claim 4 wherein said adhesive is a solventless adhesive.

6. A method as claimed in claim 2 wherein said laminate comprises a nylon/polyethylene film.

7. A method as claimed in claim 3 wherein step (c) includes securing a second said laminate to said second flexible plastic valve sheet coincident to the inlet end of said second flexible plastic valve sheet.

* * * * *